United States Patent
Barbosa

(10) Patent No.: US 7,090,424 B2
(45) Date of Patent: Aug. 15, 2006

(54) BALL-END PIN WITH PLASTIC FLANGE

(75) Inventor: Heitor Teofilo Barbosa, São Caetano Do Sul (BR)

(73) Assignee: Dana Industrial S/A, Sao Paulo (BR)

( * ) Notice: Subject to any disclaimer, the term of this patent is extended or adjusted under 35 U.S.C. 154(b) by 393 days.

(21) Appl. No.: 10/190,473

(22) Filed: Jul. 9, 2002

(65) Prior Publication Data
US 2003/0039508 A1    Feb. 27, 2003

(30) Foreign Application Priority Data
Aug. 21, 2001   (BR) .................................. 0104813

(51) Int. Cl.
*F16B 7/10*    (2006.01)

(52) U.S. Cl. ...................... 403/51; 403/50; 403/122

(58) Field of Classification Search ............... 403/50, 403/51, 76, 90, 115, 122, 130, 132–134, 222; 277/634–636; 464/173, 175; 74/18, 18.1, 74/18.2
See application file for complete search history.

(56) References Cited
U.S. PATENT DOCUMENTS
1,175,880 A * 3/1916 Cookingham ............... 464/175
3,248,955 A * 5/1966 Templeton .................... 403/50
5,066,159 A * 11/1991 Urbach ........................ 403/134
5,312,200 A * 5/1994 Buhl et al. ................... 403/134

* cited by examiner

Primary Examiner—J. J. Swann
Assistant Examiner—Victor MacArthur
(74) Attorney, Agent, or Firm—Berenato, White & Stavish LLC

(57) ABSTRACT

A ball-end pin with plastic flange is employed in steering or suspension systems of automotive vehicles, manufactured in two discrete parts, namely, the ball-end pin itself and the flange. The flange is made of plastic material by injection process, one providing its external circumference with a channel for the fixing of the smaller diameter opening of the protection cover of the ball joint, and it may be injected directly on the ball-end pin or injected separately, in which case its central orifice must have a certain conical shape and longitudinal protrusions. The ball-end pin is constructed by stamping process and during the process the same will be provided with a conical section with longitudinal grooves that eliminates the use of the machining process. The assembling of the flange on the ball-end pin may be performed in two ways: by injecting the plastic material directly on the ball-end pin; or by molding the flange separately, also by injection process, in such a way that it will be sufficient to couple the flange to the ball-end pin and the two parts will be firmly fixed to each other without any rotational or longitudinal movement.

9 Claims, 1 Drawing Sheet

BALL-END PIN WITH PLASTIC FLANGE

FIELD OF THE INVENTION

This invention refers to a constructional form of a ball-end pin with a plastic flange to be applied in ball joints of the steering and suspension systems of automotive vehicles.

DESCRIPTION OF RELATED ART

The ball joints of the steering systems and vehicular suspension are composed, in general, of a box with a housing area in its interior, of cylindrical or ball shape, in which is introduced a bearing that mounts a ball-end pin. The assembled set has the function of providing angular and rotational movements between two parts of a vehicle, that are fixed, one to the joint box and the other to the ball-end pin body, that protrudes through an opening of the ball joint box. In this way, the ball-end pin of the vehicular ball joint has as a principal function to fix the ball joint to a part or component of the steering or suspension system and, together with the box of the ball joint, that is fixed to another part or component of the same steering or suspension system, to release the angular and rotational movement of both parts around its ball, withstanding the strains that are concentrated therein.

Several shapes of flanged ball-end pins are known and in the majority of the times these pins are built by the process of stamping of metallic materials. The flange of the ball-end pin is responsible for providing adequate positioning and fixing of the part or component of the steering or suspension system. The rigidity in the dimensional characteristics of this part is of fundamental importance for the correct functioning of the ball joint, that is a piece of high responsibility, classified as a "security part".

In the processes of manufacturing of pins flanged by stamping of metals, the flanges of the pins and the ball-end pins in question constitute a single part and, because of this structure the quality of the materials (deformability) has to be superior, which increases the cost. Moreover, there is the need of higher manufacturing cares, as they accumulate areas with tensions (cracks).

SUMMARY OF THE INVENTION

The main objective of the instant invention is to improve the manufacturing process by means of plastic molding, as this process gives to the component the desired mechanical characteristics of resistance and durability. Thus, without deviating from this concern and objective, this invention anticipates the manufacture of the flanged ball-end pin divided in two parts for posterior assembling. This construction innovation will result in important technical effects for the final product, with greater dimensional accuracy and greater reduction of the manufacturing cost, as it simplifies the design, increases the working life of the molding tools and, principally, considerably decreases the loss of material in the process and contributes to the preservation of the environment, providing savings of electric power. From this construction, ball-end pin and flange separated, namely, in two parts, there derive other important technical effects, as it is the case of this invention, in which the flange is made of injected plastic material, thus eliminating the stamping and machining processes.

The invention provides the construction of longitudinal grooves in the region of the ball-end pin where the plastic flange will be coupled, which grooves are constructed by the very deformation of the material of the ball-end pin during the stamping process without any machining whatsoever.

Next, two options of construction and assembling of the plastic flange may be utilized in its appropriate region in the ball-end pin. According to a first option, one may inject the flange directly over the ball-end pin and, as a second option, one may inject the flange separately and mount it, afterwards, on the ball-end pin. In any of the options, the flange will be provided, in its central orifice, with conical shape and longitudinal protrusions that will fit perfectly in the cone and in the longitudinal grooves of the ball-end pin, preventing the parts from moving in relation to one another, both in the rotational and in the longitudinal direction. The second option will allow further the assembling of the entire set of the ball joint, but without the flange, thus eliminating the use of a specific tool for the assembling of the protection cover, after which the flange is assembled on the ball-end pin.

Other technical effects not less important to this invention are related to the fact that the flange, injected as plastic material, besides being intended to its main function of stopping of the counter-piece to be fixed to the ball-end pin, further is provided in its external circumference with the channel appropriate for the fixing of the smaller diameter opening of the protection cover. The construction of this channel on the flange itself completely eliminates any machining of the ball-end pin, with exception of the thread, which allows the utilization of the ball-end pin immediately after the stamping, without machining, considerably lowering the cost of the same, whether by savings of material or by elimination of the machining process.

BRIEF DESCRIPTION OF DRAWINGS

The attached drawings show preferred embodiments of the invention, in which.

DETAILED DESCRIPTION OF PREFERRED EMBODIMENT

Figure 1:
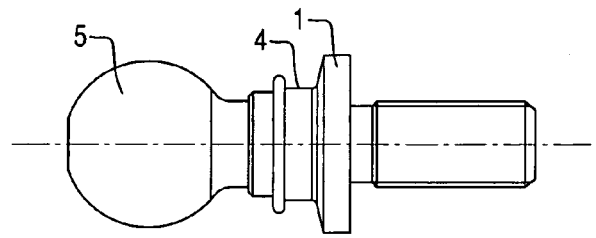
FIG. 1 shows a flanged ball-end pin illustrating its constructional details.
Figure 2:
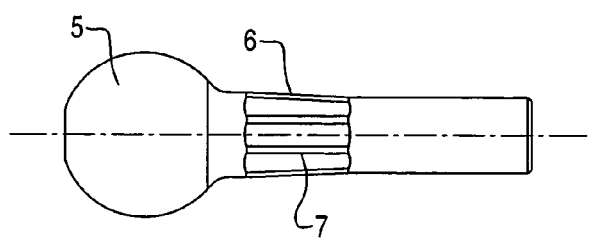
FIG. 2 shows the ball-end pin manufactured according to this invention without the flange.
Figure 3:
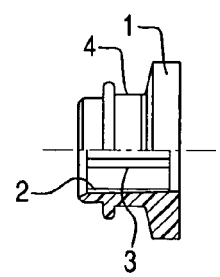
FIG. 3 shows an embodiment of the flange separate from the ball-end pin; and, FIG. 4 shows a ball joint in longitudinal cross section assembled with the flange to form a flanged pin.
Figure 4:
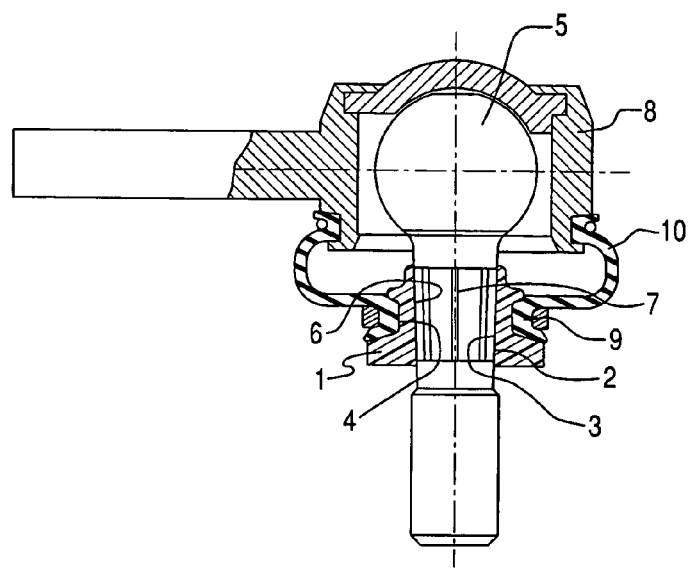

As it can be seen from the attached drawings, the flange 1 made of plastic materials has a conical central orifice 2 with longitudinal splines or protrusions 3, wherein the outermost circumference there is provided a channel 4 for the fixing of the smaller diameter opening of the protection cover or boot 10. The boot is molded by injection process directly over ball-end pin 5 or seperately and extends between the channel 4 and the housing 8. The ball-end 5, which is made of metallic material, is shaperd by a stamping process and has a conical section 6 provided with longitudinal splines or grooves 7.

In the process of assembling of the flange 1 on the ball-end pin 5, two options may be applied according to the preferred embodiments. In the first option, one injects the plastic material constituting the flange 1 directly over the conical section 6 provided with longitudinal splines or grooves 7 of the ball-end pin 5. Thus, the plastic material of the flange 1 will fill the longitudinal grooves 7 of conical section 6 of the ball-end pin 5, with the flange 1 remaining firmly fixed on the ball-end pin 5 and preventing any rotational or longitudinal movement. In the second option, one injects the plastic material constituting the flange 1 separately, thus obtaining after the injection a flange 1 with a conical central orifice 2 provided with longitudinal splines or protrusions 3 that are perfectly coincident with the longitudinal splines or grooves provided in the conical section 6 of the ball-end pin 5, manufactured by stamping process, in such a way that the two parts fit perfectly, whether concerning the conical shape or concerning the protrusions and grooves. Hence, the longitudinal protrusions 3 of the conical central orifice 2 of the flange 1 fill entirely the longitudinal grooves 7 of the conical section 6 of the ball-end pin 5 giving to the assembly a firm coupling that will prevent that the parts from moving in relation to one another, whether in the rotational or in the longitudinal direction. This second option will allow the assembling of the whole set of the ball joint 8, and, only after this assembling the flange 1 will be coupled to the ball-end pin 5. This means that the use of a specific tool for the introduction of the opening of smaller diameter 9 of the protection cover 10 over the flange 1 will not be required any more, as, without the flange 1, the assembling of the protection cover 10 may be made without any additional effort, after which one couples the flange 1 to the conical section 6 of the ball-end pin 5. The flange 1, by its turn, has in its external circumference a channel 4 designed during the injection process intended to fix the smaller diameter opening 9 of the protection cover 10, which will permit the complete elimination of the machining of the ball-end pin 5, with exception of the thread, what is translated in a substantial lowering of the costs, as, by eliminating the machining process of the flange 1 as it is constituted of a piece separated and injected in plastic material. Moreover, the construction eliminates the machining of the channel of fixing of the smaller diameter opening 9 of the protection cover 10, that would be made in the ball-end pin 5, and that according to this invention is already constructed in the external circumference of the flange 1 during the injection process, the ball-end pin 5 after the stamping will not require any machining whatsoever, except for the making of the thread.

While the foregoing invention has been shown and described with reference to preferred embodiments, it will be understood by those of skill in the art that various changes in form and detail may be made therein without departing from the spirit and scope of the invention.

The invention claimed is:

1. A ball joint assembly employed in ball joints of the steering and suspension systems of vehicles, comprising a ball-end pin and a separate plastic flange formed to receive a protection cover, wherein the flange is made of injected plastic material and has a conical central orifice with at least one of longitudinally-extending protrusions and grooves,
   wherein the ball-end pin is shaped by a stamping process and has a conical section with longitudinally-extending grooves that eliminates the machining process, said grooves being formed during the stamping process to mate with said longitudinally-extending protrusions.

2. The ball joint assembly according to claim 1, wherein the flange is manufactured directly on the ball-end pin, through injection process, wherein the ball-end pin and flange remain firmly fixed one to the other, because during the plastic injection for the flange, the plastic material fills the grooves provided in the conical section of the ball-end pin, thereby preventing the flange from performing rotary or longitudinal movements relative to the ball-end pin.

3. The ball joint assembly according to claim 2, wherein a channel is molded in the external circumference of the flange injected in plastic material, said channel adapted to receive a smaller diameter opening of the protection cover, in order to eliminate a machining process for the channel in the ball-end pin.

4. The ball joint assembly according to claim 1, wherein the flange is molded separately from the ball-end pin, by injection process that will shape its central orifice with a conical shape and protrusions that will match with the conical shape and grooves of the ball-end pin, in order that the two parts may be coupled, whether relative to the conical shape, whether relative to the matching of the grooves of the ball-end pin with the protrusions of the flange, so that when coupled the flange will not be able to move in relation to the ball-end pin, whether rotationally or longitudinally.

5. The ball joint assembly according to claim 1, wherein a channel is molded in the external circumference of the flange injected in plastic material, said channel adapted to receive a smaller diameter opening of said protection cover, in order to eliminate a machining process for the channel in the ball-end pin.

6. A ball joint assembly employed in ball joints of the steering and suspension systems of vehicles, comprising
   a ball-end pin member having a spherical ball portion and a pin portion extending from the ball portion;
   a substantially rigid flange member matingly disposed on said pin portion, said flange member having a conical central orifice; and
   a resilient boot member extending from said flange member to a housing encapsulating said spherical ball portion,
   wherein said pin portion has a conical section, said conical section of said pin portion and said central orifice of said flange member being formed with matching longitudinally-extending grooves and protrusions to mate said flange member with said pin portion.

7. The ball joint assembly according to claim 6, wherein the ball-end pin member is shaped by a stamping process.

8. The ball joint assembly according to claim 6, wherein the flange member is manufactured directly on the ball-end pin member, through injection process, wherein the ball-end pin member and said flange member remain firmly fixed one to the other, because during the plastic injection for the flange member, plastic material fills the grooves provided in one of the conical section and central orifice, thereby preventing the flange member from performing rotary or longitudinal movements relative to the ball-end pin member.

9. The ball joint assembly according to claim 6, wherein the flange member is molded separately from the ball-end pin member, by injection process that will shape the central orifice with a conical shape and protrusions that will match with the conical shape and grooves of the ball-end pin member, in order that the two parts may be coupled, whether relative to the conical shape, whether relative to the matching of the grooves of the ball-end pin member with the protrusions of the flange member, so that when coupled the flange member will not be able to move in relation to the ball-end pin member, whether rotationally or longitudinally.

* * * * *